(12) United States Patent
Robinson et al.

(10) Patent No.: US 7,840,602 B2
(45) Date of Patent: Nov. 23, 2010

(54) COMPUTER DATABASE ACCESS

(75) Inventors: Michael C. Robinson, Roseville, CA (US); Jon C. Wilhelmsen, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1641 days.

(21) Appl. No.: 10/633,804

(22) Filed: Aug. 4, 2003

(65) Prior Publication Data
US 2005/0033743 A1 Feb. 10, 2005

(51) Int. Cl.
G06F 7/00 (2006.01)
G06F 17/30 (2006.01)
(52) U.S. Cl. .................. 707/802; 707/790; 707/791
(58) Field of Classification Search .................. 709/223; 707/2, 802, 790, 791
See application file for complete search history.

(56) References Cited
U.S. PATENT DOCUMENTS
6,950,864 B1 * 9/2005 Tsuchiya .................... 709/223

OTHER PUBLICATIONS

Mauro et al, "Essential SNMP," Oct. 15, 2001, published by O'Reilly, Sections 1.4, 2.6.1, 2.6.4, 5.1-2.*

* cited by examiner

Primary Examiner—Tony Mahmoudi
Assistant Examiner—Paul Kim

(57) ABSTRACT

Disclosed are systems and methods for a management application accessing a database of interest, including the management application creating an object for indicating a unique identifier for a data item using a SET command; an agent storing the unique identifier in the restricted intermediate database; the management application creating an object for indicating a data type for the data item, the creating including use of a SET command; the agent storing the data type in the restricted intermediate database; the management application creating an object for indicating an action to be performed on the data item with respect to the database of interest, the creating including use of a SET command; the agent issuing an action command to perform the action; and the agent receiving a response and sending it to the management application.

17 Claims, 3 Drawing Sheets

COMPUTER DATABASE ACCESS

The present invention relates generally to the operation of computer systems and networks and more specifically to accessing databases associated with computer systems and networks.

In the operation of computer systems and networks, it is often desirable to access databases that are not accessible via the existing uses of widely used standardized database access methods and systems, e.g., Simple Network Management Protocol ("SNMP"); the Telnet protocol; and various World Wide Web browsers such as Microsoft Corp.'s INTERNET EXPLORER® and Netscape Communication Corp.'s NETSCAPE®. For example, a network device such as a print server may be associated with a database containing data concerning the print server and/or its software, where the database is restricted, e.g., for proprietary or security reasons, from access by normally used standardized database access methods and systems.

One prior method of accessing data makes use of the provision by typical databases of record-based abstraction where there is a correlation of one unique index per record. Such databases may be queried using conditional search criteria. However, it is often desirable to work with devices such as the print server in the example above, for instance, to test such devices, in part by accessing restricted data. If the data sought is restricted by, for example, not being abstracted such that a conditional search will detect it, this prior method will not be able to access the data sought.

SUMMARY OF THE INVENTION

Systems and methods are disclosed for accessing databases associated with computer systems and networks.

BRIEF DESCRIPTION OF THE DRAWINGS

The present invention provides systems and methods for the access of data in databases that may be otherwise inaccessible.

DETAILED DESCRIPTION

Broadly stated, the present invention is directed to systems and methods for use of a unique identifier in a restricted intermediate database, where the restricted intermediate database can be used to store a group of objects pertaining to a database of interest to provide access to any record in the database of interest.

Figure 1:
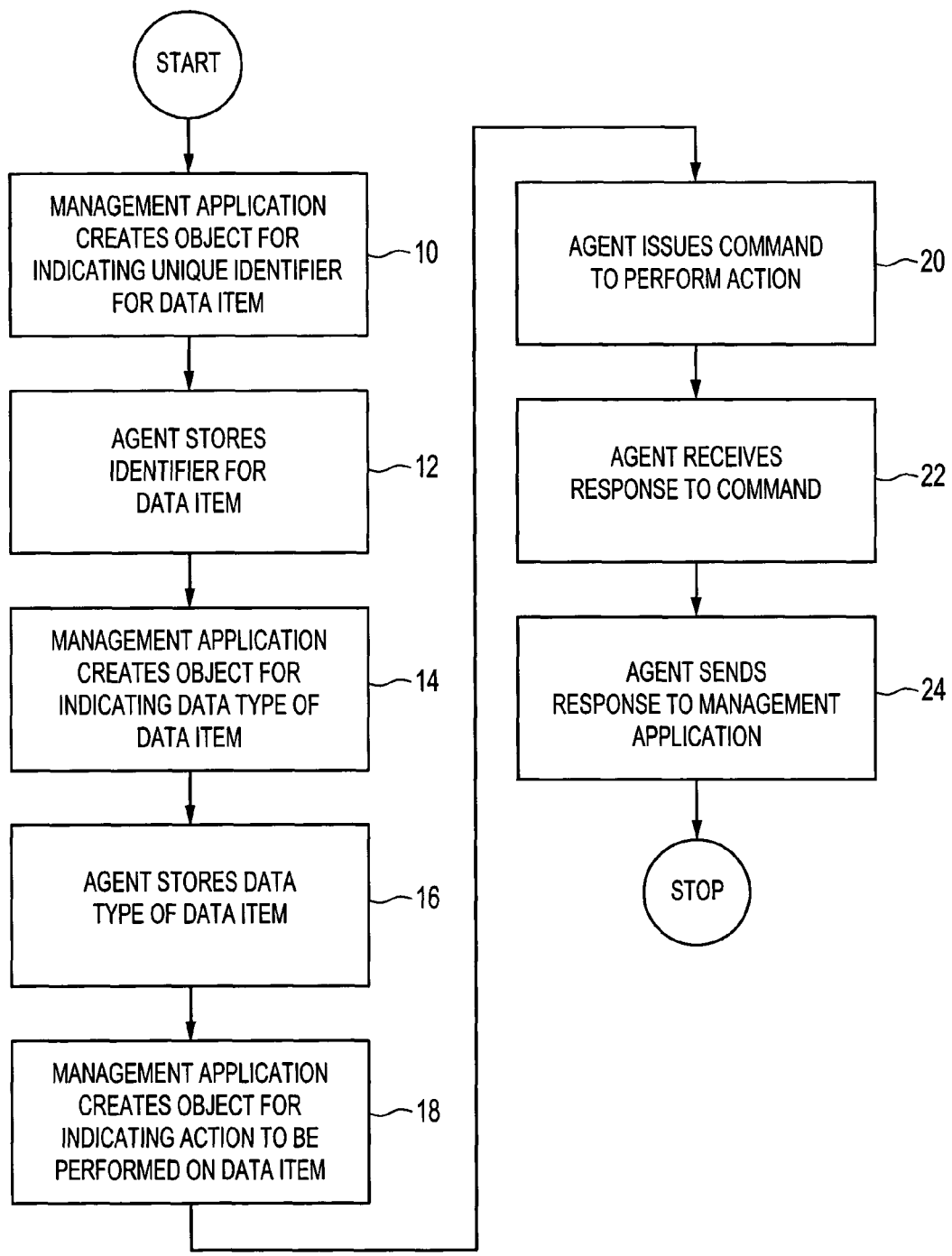
FIG. 1 is a flowchart showing an embodiment of the invention.

Turning now to FIG. 1, showing a flowchart of an embodiment of the invention, a management application creates an object for indicating a unique identifier that identifies a data item (10). The management application may be but is not limited to a management application used in Simple Network Management Protocol ("SNMP"). The data item may be but is not limited to a data item that is stored in, or is to be stored in, a restricted database of interest, i.e., a database to which access is unavailable via existing methods of using standardized access systems, e.g., SNMP; the Telnet protocol; and various World Wide Web browsers such as Microsoft Corp.'s INTERNET EXPLORER® and Netscape Communication Corp.'s NETSCAPE®. The unique identifier may be but is not limited to an index entry or key that is unique to a particular data item and that is available for use in a restricted intermediate database by an embodiment of the invention. An agent stores the unique identifier in the restricted intermediate database (12). The agent may be but is not limited to an agent used in SNMP. The management application creates an object for indicating the data type of the data item, e.g., numerical value or string (14). The agent stores the data type of the data item in the restricted intermediate database (16). The management application creates an object for indicating an action to be performed on the data item with respect to the database of interest, e.g., retrieval of the data item from the database of interest, addition of the data item to the database of interest, or use of the data item to change data in the database of interest (18). Hereinafter, and in FIGS. 1 and 2, "storing the data item in the database of interest" and like phrases encompass adding the data item to the database of interest and using the data item to change data in the database of interest. The agent issues a command to perform the action (20). The agent receives a response to the command (22). The agent sends the response to the management application (24).

Figure 2:
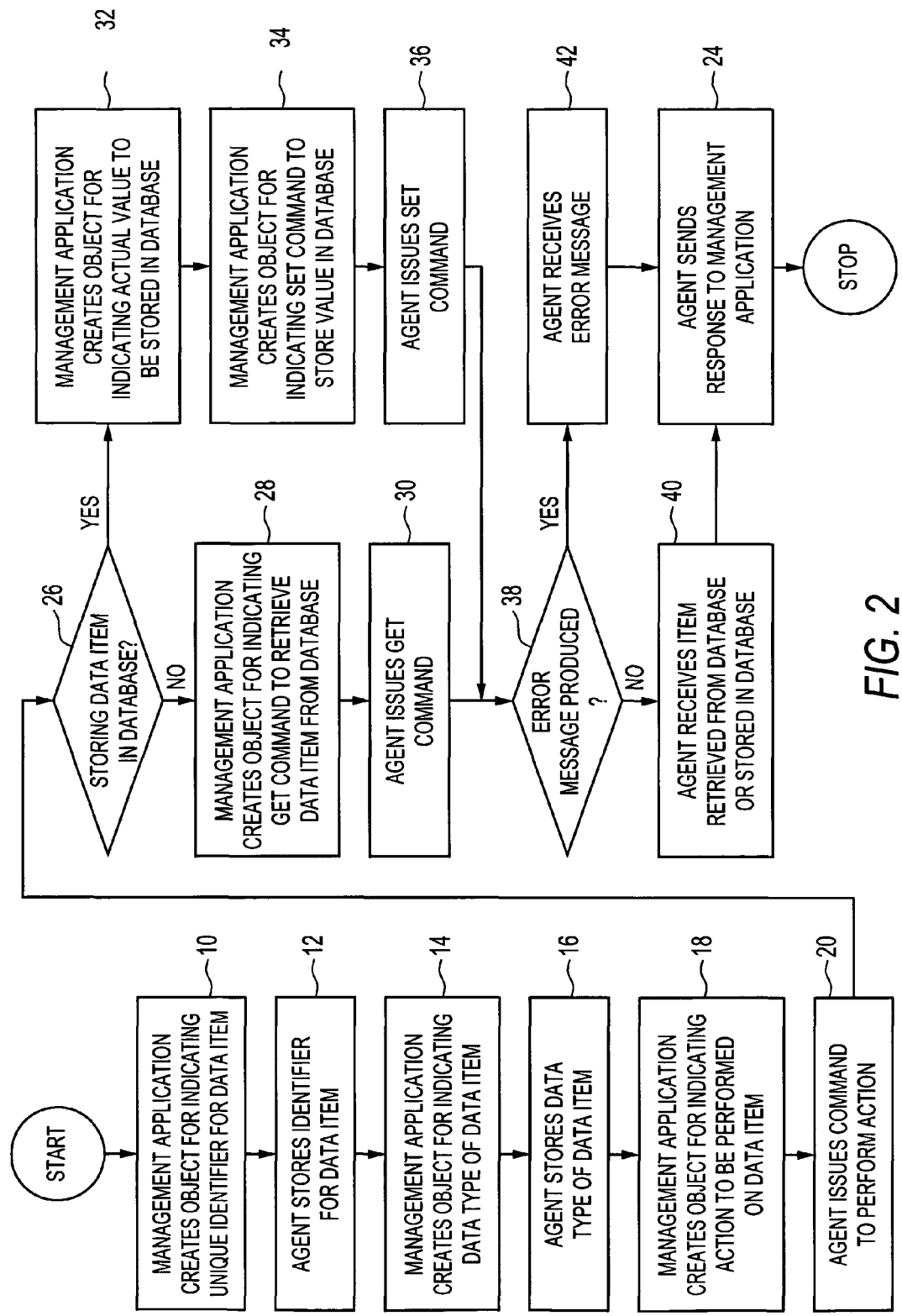
FIG. 2 is a flowchart showing another embodiment of the invention.

Turning now to FIG. 2, showing a flowchart for another embodiment of the invention, steps 10, 12, 14, 16, 18, and 20 are as described above in reference to FIG. 1. After an agent issues a command to perform an action on a data item with respect to the database of interest (20), the management application determines if the action requires that the data item be stored in the database (26).

If the action does not require that the data item be stored in the database of interest, the management application creates an object for indicating a GET command to retrieve the data item from the database of interest (28). The agent issues the GET command (30).

If the action requires that the data item be stored in the database of interest, the management application creates an object for indicating the actual value of the data item to be stored in the database of interest (32). The management application creates an object for indicating a SET command to store the data item in the database of interest (34). The agent issues the appropriate SET command (36).

The issuing of the GET command (30) or the issuing of the SET command (36) may result in an error message signaling the failure of the either of the commands (38). If the issuing of the GET command (30) or the issuing of the SET command (36) produces an error message, the agent receives the error message as a response (42). If issuing of the GET command (30) or the issuing of the SET command (36) is successful, the agent receives the data item that has been stored (if a SET command was issued) or retrieved (if a GET command was issued) as a response (40). In either case, receiving the data item (40) or receiving an error massage (42), the agent sends the response to the management application (24) as previously described with reference to FIG. 1.

Figure 3:
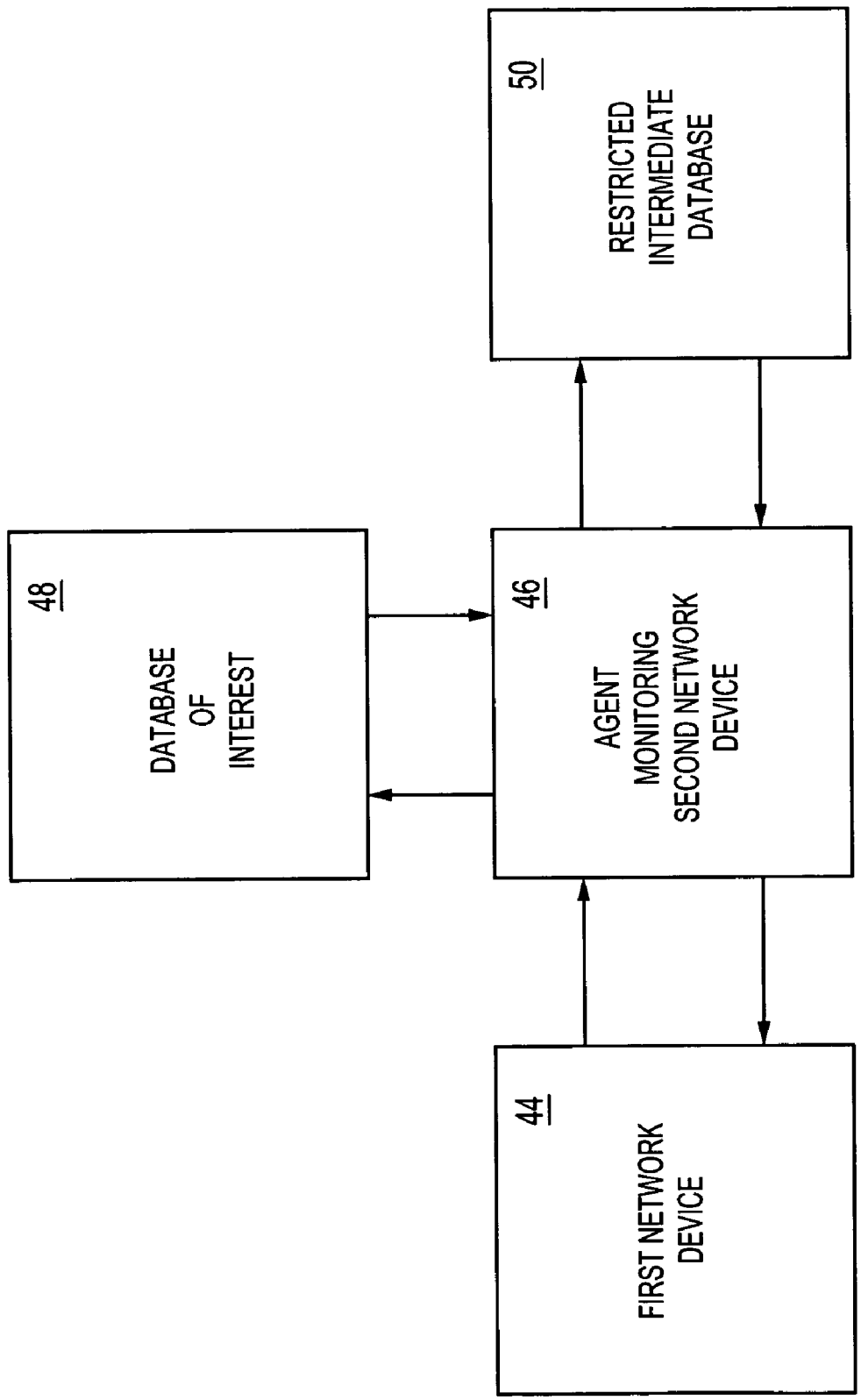
FIG. 3 is a block diagram showing another embodiment of the invention.

Turning now to FIG. 3, showing a block diagram of another embodiment of the invention, a first network device 44 is operatively coupled to a second network device (not shown), and an agent software program 46 is programmed to monitor the second network device. First network device 44 is programmed to create a first object for indicating a unique identifier for a data item, to create a second object for indicating a data type for the data item, to create a third object for indicating an action to be performed on the data item with respect to the database of interest 48, and to receive a response to an action command to perform an action on the data item with respect to the database of interest 48. Agent 46 is programmed to store the unique identifier in restricted intermediate database 50, to store the data type in restricted intermediate database 50, to issue the action command, to receive the response, and to send the response to the first network device.

While embodiments of the invention are useful in accessing restricted databases, the embodiments are not limited to such restricted databases.

It is apparent to those of ordinary skill in the art that various embodiments of the inventions may be implemented through the use of a variety of tools, including but not limited to SNMP; the Telnet protocol; and various World Wide Web browsers such as Microsoft Corp.'s INTERNET EXPLORER® and Netscape Communication Corp.'s NETSCAPE®. It is further apparent to those of ordinary skill in the art that steps presented herein in embodiments of the invention may be near-simultaneous, or in an order other than that presented herein, depending, among other things, on the tools used and the circumstances of use.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

What is claimed is:

1. A method for accessing a database of interest, the method comprising:
    a management application creating a first object for indicating a unique identifier identifying a data item, said creating said first object using a first SET command;
    an agent receiving said unique identifier from said management application and storing said unique identifier in a restricted intermediate database which is distinct from the database of interest and to which access is unavailable with the management application, wherein the agent is distinct from the restricted intermediate database and the database of interest;
    said management application creating a second object for indicating a data type for said data item, said creating said second object using a second SET command;
    said agent receiving said data type from said management application and storing said data type in said restricted intermediate database;
    said management application creating a third object for indicating an action to be performed on said data item with respect to the database of interest, said creating said third object using a third SET command;
    said agent receiving said action from said management application and issuing an action command to the database of interest to perform said action on said data item, wherein said agent uses said stored unique identifier, said stored data type, and said action in issuing said action command; and
    said agent receiving a response to said action command from the database of interest and sending said response to said management application.

2. The method recited in claim 1, wherein
said response indicating success is said data item.

3. The method recited in claim 1, wherein
said response indicating failure is an error message.

4. The method recited in claim 1, wherein
said action is a returning to said management application of said data item from the database of interest, and
said action command is a GET command.

5. The method recited in claim 1, wherein
said action is a storing of said data item in the database of interest;
said action command is a fourth SET command; and
further comprising:
said management application creating a fourth object for indicating an actual value of said data item to be stored in the database of interest.

6. The method recited in claim 1, wherein
the database of interest is a restricted database.

7. An apparatus for accessing a database of interest, the apparatus comprising:
    a first network device providing a management application;
    a second network device operatively coupled to said first network device; and
    an agent configured to monitor said second network device;
    wherein said management application of said first network device is configured to:
    create a first object for indicating a unique identifier for a data item using a first SET command,
    create a second object for indicating a data type for said data item using a second SET command,
    create a third object, using a third SET command, for indicating an action to be performed on said data item with respect to the database of interest, and
    receive a response to an action command to perform said action; and
    wherein said agent is further configured to:
    receive said unique identifier from said first network device and store said unique identifier in a restricted intermediate database which is distinct from the database of interest and to which access is unavailable with the management application,
    receive said data type from said first network device and store said data type in said restricted intermediate database,
    receive said action from said first network device and issue said action command to the database of interest to perform said action on said data item using said stored unique identifier, said stored data type, and said action, and
    receive said response from the database of interest, and send said response to said first network device,
    wherein said agent is distinct from the restricted intermediate database and the database of interest.

8. The apparatus recited in claim 7, wherein
said action is a returning to said first network device of said data item from the database of interest,
said action command is a GET command, and
said response is said data item.

9. The apparatus recited in claim 7, wherein
said action is a storing of said data item in the database of interest,
said action command is a fourth SET command, and
said first network device is further programmed to create a fourth object for indicating an actual value of said data item to be stored in the database of interest.

10. The apparatus recited in claim 7, wherein
said second network device is a monitored device.

11. The apparatus recited in claim 7, wherein
said response indicating success is said data item.

12. The apparatus recited in claim 7, wherein
said response indicating failure is an error message.

13. The apparatus recited in claim 7, wherein
the database of interest is a restricted database.

14. An apparatus for accessing a database of interest, the apparatus comprising:
   a network management station;
   a device operatively coupled to said network management station; and
   an agent programmed to monitor said device;
   wherein said network management station is programmed to:
   create a first object for indicating a unique identifier identifying a data item using a first SET command,
   create a second object for indicating a data type for said data item using a second SET command,
   create a third object, using a third SET command, for indicating an action to be performed on said data item with respect to the database of interest, and
   receive a response to said action; and
   wherein said agent is further programmed to:
   receive said unique identifier from said network management station and store said unique identifier in a restricted intermediate database which is distinct from the database of interest and to which access is unavailable by the management application,
   receive said data type from said network management station and store said data type in said restricted intermediate database,
   receive said action from said network management station and issue said action command to the database of interest to perform said action on said data item using said stored unique identifier, said stored data type, and said action, and
   receive a response to said action command from the database of interest, and send said response to said network management station,
   wherein said agent is distinct from the restricted intermediate database and the database of interest.

15. The apparatus recited in claim 14, wherein
   said action is a returning to said network management station of said data item from the database of interest,
   said action command is a GET command, and
   said response is said data item.

16. The apparatus recited in claim 14, wherein
   said action is a storing of said data item in the database of interest, and
   said action command is a fourth SET command, and
   said network management station is further programmed to create a fourth object for indicating an actual value of said data item to be stored in the database of interest.

17. A computer-readable medium having computer-readable instructions for performing a method of accessing a database of interest, the method comprising:
   a management application creating a first object for indicating a unique identifier identifying a data item, said creating said first object using a first SET command;
   an agent receiving said unique identifier from said management application and storing said unique identifier in a restricted intermediate database which is distinct from the database of interest and to which access is unavailable by the management application, wherein the agent is distinct from the restricted intermediate database and the database of interest;
   said management application creating a second object for indicating a data type for said data item, said creating said second object using a second SET command;
   said agent receiving said data type from said management application and storing said data type in said restricted intermediate database;
   said management application creating a third object for indicating an action to be performed on said data item with respect to the database of interest, said creating said third object using a third SET command;
   said agent receiving said action from said management application and issuing an action command to the database of interest to perform said action on said data item, wherein said agent uses said stored unique identifier, said stored data type, and said action in issuing said action command; and
   said agent receiving a response to said action command from the database of interest and sending said response to said management application.

* * * * *